United States Patent
Cantley et al.

(10) Patent No.: US 8,104,673 B2
(45) Date of Patent: Jan. 31, 2012

(54) METHOD AND SYSTEM FOR PROCESSING IMAGE RETURNS

(75) Inventors: Kerry Michelle Cantley, Fort Mill, SC (US); David Todd Frew, Fort Mill, SC (US); Kelly Scot Hall, Charlotte, NC (US); William R. Gollnick, Indian Trail, NC (US); Scott Samuel Murray, Charlotte, NC (US); Jeffrey R. Woodside, Huntersville, NC (US)

(73) Assignee: Bank of America Corporation, Charlotte, NC (US)

( * ) Notice: Subject to any disclaimer, the term of this patent is extended or adjusted under 35 U.S.C. 154(b) by 19 days.

(21) Appl. No.: 11/427,020

(22) Filed: Jun. 28, 2006

(65) Prior Publication Data

US 2008/0000962 A1 Jan. 3, 2008

(51) Int. Cl.
*G06Q 40/00* (2006.01)
(52) U.S. Cl. ..................................................... 235/379
(58) Field of Classification Search .............. 705/38, 705/39, 45; 235/379; 707/3
See application file for complete search history.

(56) References Cited

U.S. PATENT DOCUMENTS

| | | | |
|---|---|---|---|
| 7,363,290 B1* | 4/2008 | Daniel et al. ................... | 707/3 |
| 2001/0037207 A1 | 11/2001 | Dejaeger | |
| 2004/0068464 A1* | 4/2004 | Buchanan et al. .............. | 705/38 |
| 2004/0133516 A1 | 7/2004 | Buchanan et al. | |
| 2005/0015341 A1 | 1/2005 | Jackson | |
| 2005/0171899 A1* | 8/2005 | Dunn et al. ..................... | 705/39 |
| 2007/0288382 A1* | 12/2007 | Narayanan et al. ............ | 705/45 |
| 2008/0006687 A1* | 1/2008 | Mueller et al. ................ | 235/379 |

OTHER PUBLICATIONS

Bank of America Corporation, PCT International Search Report, issued in corresponding International Patent Application No. PCT/US2007/072084, Jan. 28, 2008.
Bank of America Corporation, PCT Written Opinion, issued in corresponding International Patent Application No. PCT/US2007/072084, Jan. 28, 2008.
Supplementary European Search Report dated Jul. 7, 2010 for European Application No. EP 07 81 2316.

* cited by examiner

*Primary Examiner* — Seung Lee
*Assistant Examiner* — Sonji Johnson
(74) *Attorney, Agent, or Firm* — Michael A. Springs; Moore & Van Allen PLLC; Jeffrey R. Gray (57) ABSTRACT

Method and system for processing image returns. Embodiments of the invention provide for automating data flow and reporting processes connected with administrate image returns to a financial institution with multiple image processing sites. A computer-implemented method of processing a cash letter file identifying returned items includes obtaining an identifier for a processing site for each item identified in the cash letter file. A separate report corresponding to each processing site as indicated by the identifier is assembled. The report lists each returned item for the processing site. Each separate report is forwarded to each processing site to enable the processing site to re-process just the returned items specific to the processing site. Provision is also made for automatically updated stored ledger information based on a cash letter settlement table.

27 Claims, 5 Drawing Sheets

402 {
REPORT ID: XXXXX              COMPANY Site A              PAGE:    1
PROGRAM ID: XXXXXXX           MASTER LIST            CAPTURE DATE: XX/XX/XX
                              *Admin Ret Items*      REPORT GENERATION TIME: 13:00:28

CAPTURE SITE: XXX   RUN: 00001   BATCH: XXXXX

404 {
              -TIME-           BAI-ENPT PST              ORIG CYCLE
SEQUENCE RECAP CAPT  ABA  ACCOUNT    ID SIT SRY   AMOUNT   SWEP#RUN# DATE — MESSAGE—

XXXXXXX XXXX XXXX XXXX-XXXX XXX-XXXXXX XX-XXXX X XXX X  1,774.07   XXXXX XXXXX XX/XX/XX

DEBIT TOTAL                    $1,774.07  ⎫
                    DEPOSIT TOTAL                       $.00  ⎬ 406
                    DIFFERENCE                     $1,774.07  ⎭
        ***** **** ***** ** *******

BATCH TOTALS: CREDITS $.00  DEBITS  $1,774.07  DIFFERENCE $1,774.07  ⎫
                                                                     ⎬ 408
RUN TOTALS:   CREDITS $.00  DEBITS  $1,774.07  DIFFERENCE $1,774.07  ⎭

METHOD AND SYSTEM FOR PROCESSING IMAGE RETURNS

BACKGROUND

Financial Institutions have established various processes and associations related to the exchange of documents and items evidencing monetary transactions. Some types of documents have been historically encoded with magnetic ink so that information from the documents can be read by machine. Such documents have thus become known as magnetic ink character recognition (MICR) documents. Historically, these documents have been at least theoretically presented by delivery of physical paper. However, many types of payments and transactions are no longer enabled by paper. Additionally, even with traditional checks, check presentment and clearing is no longer accomplished using the physical checks, even though paper checks may be still be shipped between banks for reconciliation or error recovery.

For some time, posting of financial transactions to accounts at a clearing institution has been accomplished through the use of a "cash letter" which contains detailed data on all the transactions to be cleared. At one time, cash letters were paper documents, but in the modern banking system, an "electronic cash letter" (ECL) is typically used. An ECL file can also be referred to as an "electronic cash presentment" (ECP) file. ECP files are formatted according to accepted industry standards. ECP files can be sent directly between financial institutions, but they are also often sent through clearing agents or a centralized, government based banking system, for example, the Federal Reserve System in the United States.

Reconciliation and error recovery based on paper documents is subject to numerous exceptions as a result of paper handling and due to late delivery of documents. Legislation has authorized banks to completely do away with the use of paper for settlement and reconciliation of accounts between banks. In the United States for example, this legislation is referred to as "The Check Clearing for the 21st Century Act" or simply "Check 21" and authorizes the use of electronic records for presentment from one bank to another as long as the images in the electronic records actually represent any original paper documents. A large financial institution must present millions of items each day to clearing financial institutions for posting. If images are used, these images are created at numerous processing sites, in many cases, from paper documents. Invariably, at least some images have quality or other problems and cannot be accepted by a clearing institution, which then notifies the bank that produced the image of the problem item so that the bank that produced the image can work with the appropriate processing site to correct the problem.

SUMMARY

Embodiments of the present invention provide for automating data flow and reporting processes connected with administrative image returns to a financial institution with multiple image processing sites. This automation can enable the exception process to be fast and efficient enough to help ensure that administrative returns are processed while paper documents are still on file.

In at least some embodiments, a computer-implemented method of processing a cash letter file identifying returned items includes obtaining an identifier for a processing site for each item identified in the cash letter file. In some embodiments, this identifier can be part of an item sequence number. A separate report corresponding to each processing site as indicated by the identifier is assembled. The report lists each returned item for the processing site. Each separate report is forward to each processing site to enable the processing site to re-process just the returned items specific to the processing site.

In some embodiments, the computer-implemented method includes updating stored ledger information based on a stored, cash letter settlement table. In some embodiments, the method includes sending at least a portion of the stored ledger information to a general ledger system to update cash letter information. Additionally, stored ledger information related to work-in-process for each processing site can be updated.

A computer program product installed in one or various processing platforms within an image processing system can be used to implement an embodiment of the invention. Thus, the means for implementing various processes that are part of the invention can include an image receiving system to receive the cash letter files, a network connected to the image receiving subsystem, and an administrative returns processing system connected to the network. The administrative returns processing system obtains the identifiers for the processing sites and sends the separate reports, one report corresponding to one processing site. The system can also include a master index connected to the network to enable updating stored ledger information, and a check image management system to archive the administrative returns.

BRIEF DESCRIPTION OF THE DRAWINGS

FIG. 3 is presented in two parts, FIG. 3A and FIG. 3B.

DETAILED DESCRIPTION OF THE INVENTION

The following detailed description of embodiments refers to the accompanying drawings, which illustrate specific embodiments of the invention. Other embodiments having different structures and operation do not depart from the scope of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following:

an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on one computer as a stand-alone software package, partly on a local computer and partly on a remote computer or entirely on the remote computer or server. In the latter scenario, the computers may be connected to one another through a physical virtual local area network (LAN) or a wide area network (WAN), or the connection may be made through the Internet.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

The meaning of certain terms as used generally in the context of this disclosure should be understood as follows. Terms such as "document," "item" or "check" and the like are meant to refer to any document which tends to be handled and sorted in large volumes based on MICR information printed thereon. For purposes of this disclosure, the terms "document," "item" or "check" and the like can also refer to images of such documents. In the typical context, such documents are checks which order a bank to pay a certain sum to the order of another individual or entity. However, other documents evidencing financial transactions relating to banking, and for that matter, other kinds of documents, can be processed according to the invention. Even in the typical banking context for example, deposit slips are sometimes MICR encoded, and could be read, sorted, and imaged in a fashion similar to checks. Thus, a system which processes such documents can be referred to as an item processing system, a check processing system, a document processing system, or an image processing system.

The term "bank" and any similar terms are used herein in their broadest sense. Financial institutions that process transactions and documents of the types discussed can include stock brokerages, credit unions, and other types of institutions which are not strictly banks in the historical sense. The use of terms such as bank, "institution" or "franchise" herein is meant to encompass all such possibilities.

Much of the terminology herein refers to the processing of information about MICR encoded documents. This information can be stored in a data processing system, in computer memory and/or media for retrieval and manipulation. There are many ways to design a system to accommodate the storage of this information, as well as the storage of electronic images of documents such as checks. For example, this terminology can refer to information stored in what is commonly known as a "check image management system" (CIMS) and within a "check processing control system" (CPCS). Such systems are well known within the banking industry by those who work in the financial data processing fields. Such data processing systems have historically been produced by the International Business Machines (IBM) Corporation. CPCS is still produced by IBM, while CIMS is today produced and marketed by Carreker Corporation of Dallas, Tex., U.S.A. Through the use of such systems, check images and index information referring to the check images, which typically includes the MICR data, can be stored according to any of various industry standard formats, such as the "common import format file" (CIFF). Such systems have been used for many years by many banks to archive check images. Images and index information in such a system can be stored in the same file or separated. In some environments, the index information is separated and stored in an electronic cash letter (ECL) for communicating between financial institutions for the purpose of settlement.

Index information can also be stored with electronic images in an "image cash letter" (ICL) to provide for the truncation of the paper documents. Again, these systems and techniques are well known by those of ordinary skill in the financial information technology arts. Note that a cash letter (CL) file can also be sent from a clearing bank to a depositary, capturing bank, or sending bank to communicate to the sending bank the existence of and details about administrative returns. These are items that were found to be unacceptable at the clearing institution, due to poor image quality, corrupted data, or some other errors, and the handling of administrative returns is what is generally addressed by example embodiments of the present invention.

By way of further introduction, a standard CPCS system, when processing documents which are imaged, assigns a check image management system (CIMS) key to each item. This CIMS key, also referred to as simply an "image key" or a "key" includes a processing cycle number, a processing cycle date and an item sequence number (ISN). The ISN typically includes a portion that is a rolling number that can be at any value when a processing cycle begins, as well as a portion that is a number that indicates the item processing (IP) site, also called the capture site, within the financial institution where the original paper item was handled. The ISN may include other portions related to additional information about the item, for example, a sorter number that corresponds to a particular sorting machine.

It should be noted that a financial institutions accounting general ledger (GL) needs to be tied into its item processing systems. This tie-in is needed so that amounts of money transferred between banks properly match up to checks being reconciled and cleared. A GL system at a large bank or financial institution may also track work-in-process (WIP) and cost center (CC) information so that appropriate accounting information can be maintained for various divisions, business units, and processing sites within the enterprise. A typical GL system includes stored ledger information regarding debits and credits to the banks accounts, and this information is typically indexed. Such systems are well-known to those of skill in the financial computing arts.

For purposes of the remainder of this discussion, it can be assumed that any terms not expressly defined have standard meanings, or meanings as would be understood by those of ordinary skill in the art. For purposes of illustration, it can also be assumed that the example embodiments described are implemented in the context of a check imaging and sorting operation at a bank or similar financial institution with multiple IP sites.

Figure 1:
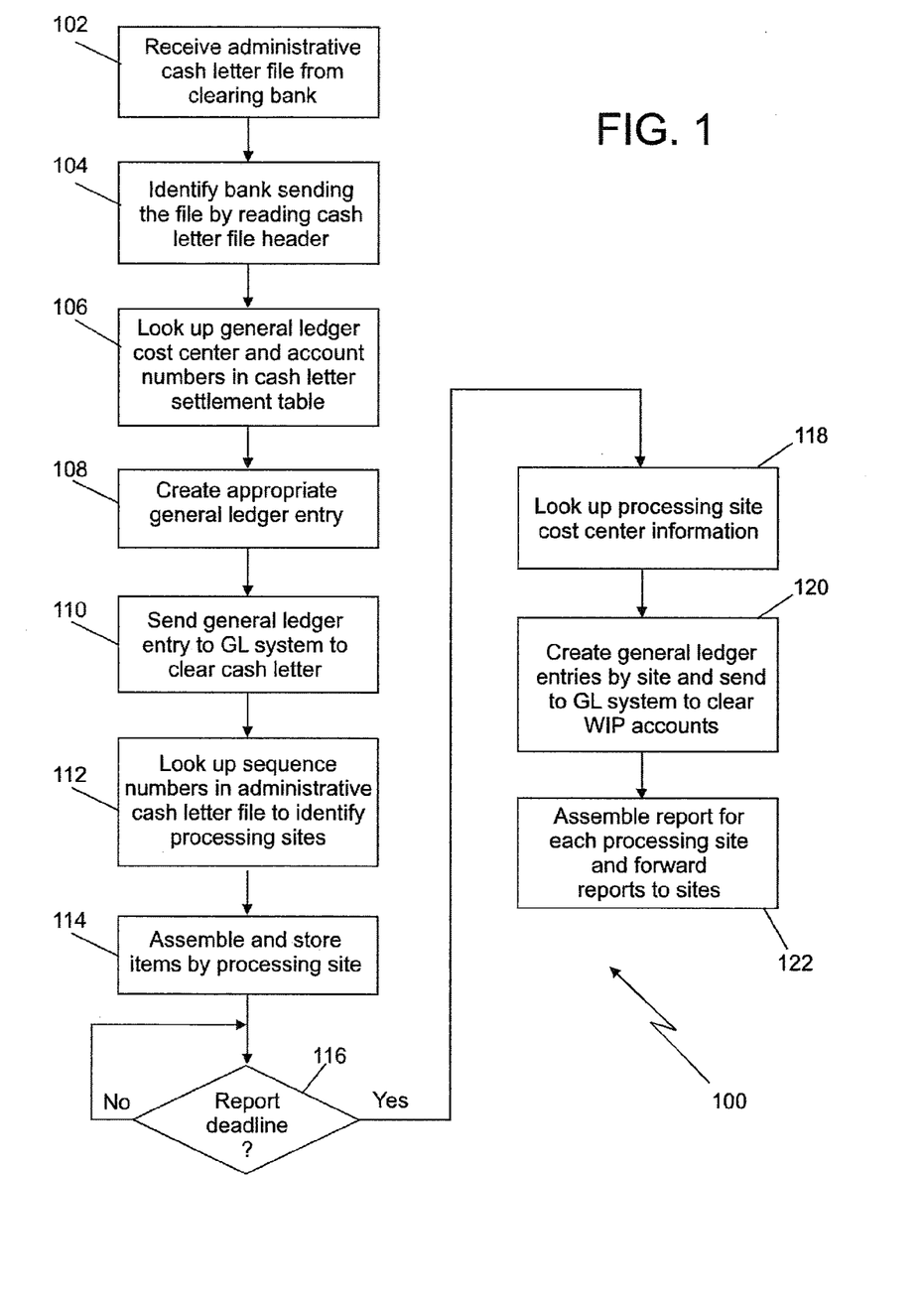
FIG. 1 is a flowchart illustrating a method according to an example embodiment of the invention.

FIG. 1 illustrates a method 100 according to example embodiments of the invention. As is typical of most flowcharts, FIG. 1 illustrates the method as a series of process blocks. At block 102, an administrative cash letter file is received from a clearing bank. In at least some embodiments, this file will be formatted according to a standard known as x9.37, which is a well known standard for formatting cash letter documents. At block 104, the cash letter file header is parsed to determine which clearing bank sent the file. This information is needed to update the accounting information in the general ledger. At block 106, the appropriate cost center and account numbers are looked up in a cash letter settlement table contained in the general ledger accounting system. At block 108 an appropriate general ledger entry is created from the information in the cash letter settlement table, and at block 110, this general ledger entry is sent to the GL system through or other appropriate transaction processing system in order to clear the cash letter from that system.

The stored, cash letter settlement table described above includes a list of clearing banks, the corresponding clearing houses or settlement agents that are used for each one, if any, as well as cost center and account numbers which correspond to the information in the general ledger. A cash letter settlement table can include any other information that a financial institution employing an embodiment of the invention wishes to track within the general ledger system.

Still referring to FIG. 1, at block 112, sequence numbers are accessed within the cash letter file to identify the appropriate item processing sites which have administrative returns identified in this particular file. In at least some embodiments, the IP sites are identified by looking up the sequence numbers within the file in a stored IP sorter matrix. At block 114, information identifying the various items is assembled and stored so that it is organized by item processing site. This information is maintained in memory until a report deadline occurs.

Block 116 of FIG. 1 is a decision block which represents a state of waiting for a report deadline. When a report deadline is reached, processing proceeds to block 118, where the cost center information for the appropriate IP site is accessed within a look-up table relating sequence number to capture site and capture site to GL account and cost center. At block 120, the appropriate general ledger entries for each site are created and sent to the GL system through CPCS or other appropriate transaction processing system to clear work in process (WIP) account entries. At block 122, a report is assembled for each processing site and forwarded to the site. In this example embodiment, reports for all sites are sent on substantially the same schedule. However, an embodiment could be devised in which reports are sent at varying times.

In some embodiments, the report is manually reviewed at each site and items are reprocessed based on the report, however, one of skill in the art could design a system which responds to the IP site reports received at each site in an automated fashion. Tables which are stored in the general ledger system to represent work in process by site can generally be formatted to list the various item processing sites within the financial institution. Additional information, such as a company or vendor which operates each site can be included. The corresponding account and cost center information for each site is also included in the site entry portion of the general ledger system.

Figure 2:
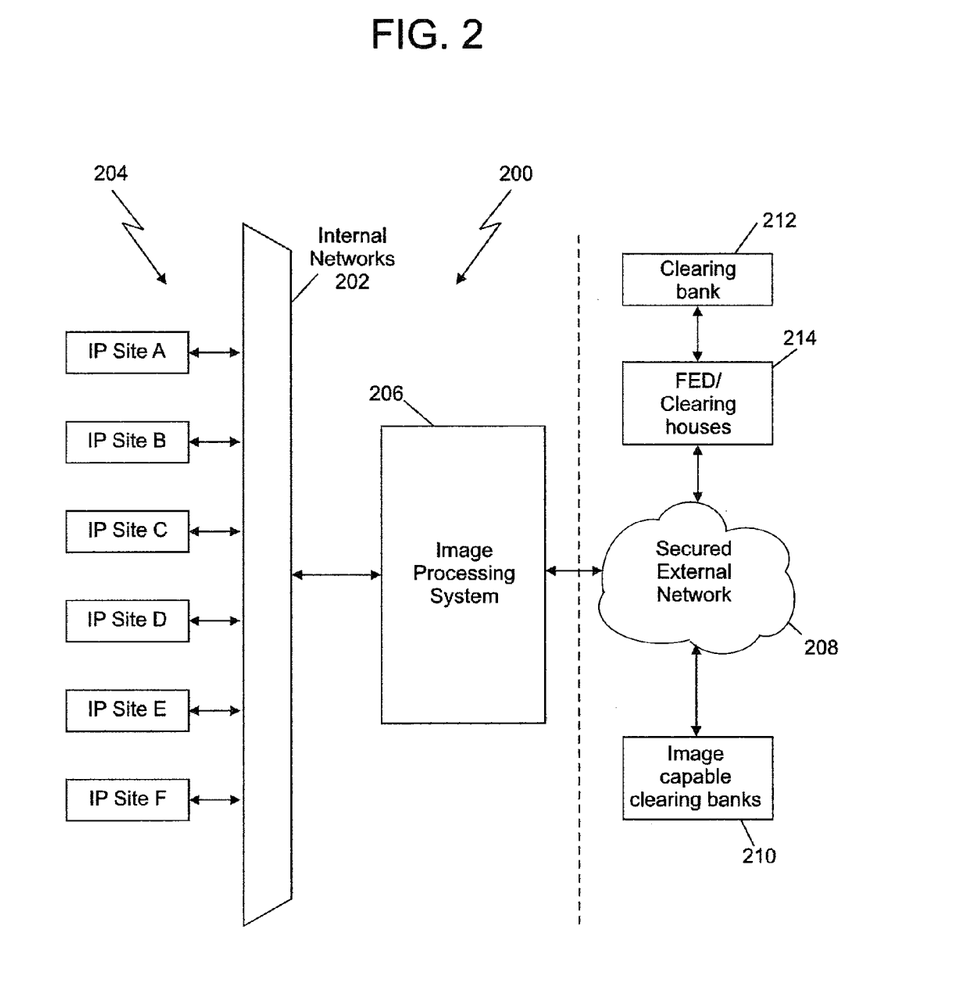
FIG. 2 is a high-level block diagram illustrating the enterprise operating environment of an image processing system employing an embodiment of the invention.

FIG. 2 illustrates a high level block diagram of an enterprise 200 wherein the various elements of the enterprise systems involved in item and image processing are illustrated. The vertical dotted line in FIG. 2 indicates the conceptual external boundary of the enterprise's systems. In FIG. 2, internal networks 202 provide an interface to the various item processing sites, which ultimately provide the source of images and information that are transferred from the enterprise to clearing institutions via cash letters. Item processing sites 204 include a site A, site B, site C, site D, site E, and site F. In an actual banking enterprise, these sites might be identified by their geographic locations. Image processing system 206 is connected to processing sites 204 via internal networks 202. These internal networks may include local area networks, wide area networks, as well as secured "pipes" through which information can traverse over the Internet or another public network.

Still referring to FIG. 2, image files in the form of cash letters, other data, and administrative return cash letters, are sent and received by the enterprise via secured external network 208. For example, image cash letters for clearing can be forwarded to image capable clearing banks 210 by image processing system 206. Other clearing banks, 212, are addressed via a clearing house, or in the United States, the Federal Reserve System, illustrated by block 214. Secured external network 208 maybe implemented by a secured connection through a public network such as the Internet. Alternatively, a private network or banking specific network such as the automated clearing house (ACH) network may be used.

Figures 3, 3A:
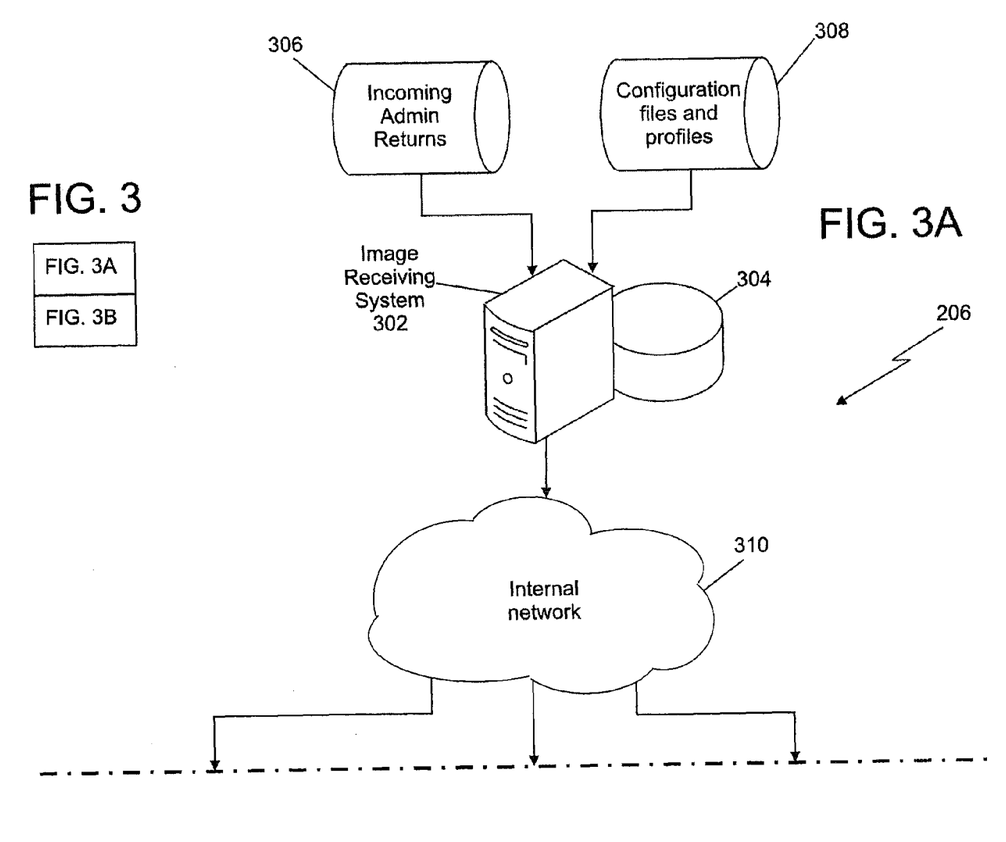
FIG. 3 is a combination block and flow diagram for the image processing system according to an embodiment of the invention.
Figure 3B:
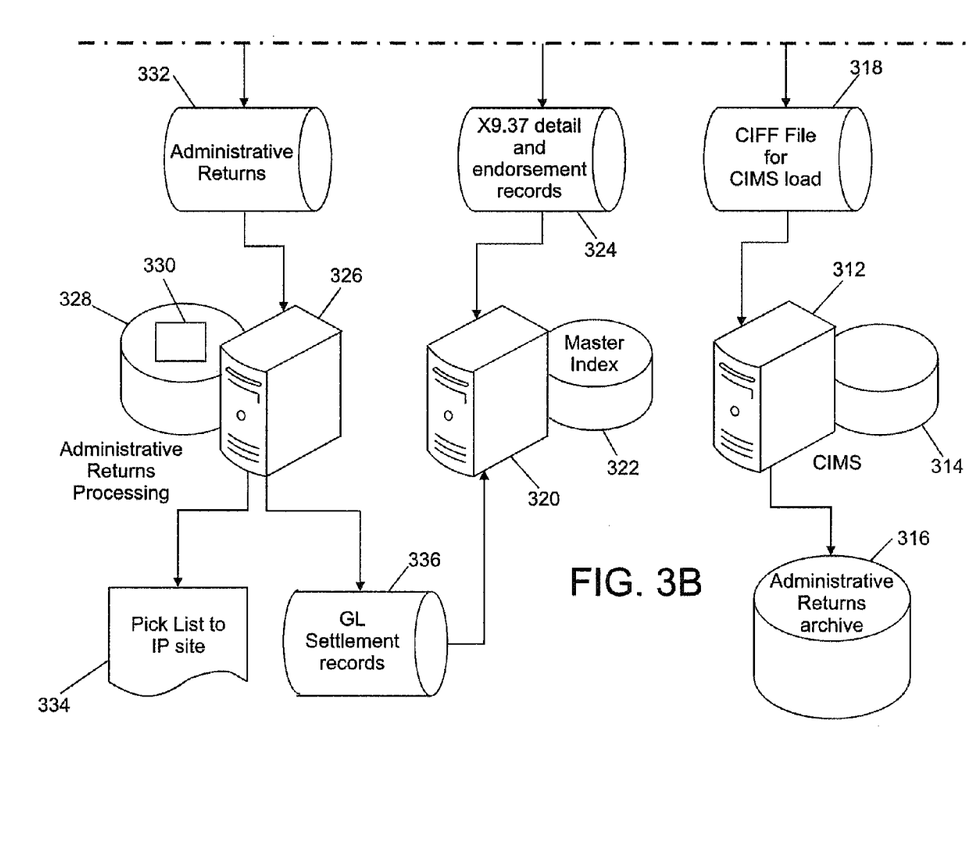

FIG. 3 is a combination block and flow diagram of an image processing system, 206. For clarity, FIG. 3 is presented in two parts as FIG. 3A and FIG. 3B. It should be noted that the image processing system is a collection of individual computing systems connected via network resources. Each instruction execution system includes a computer readable storage media. The computer readable storage media maybe used to store data either temporarily or permanently, as well as store computer program instructions which may be used to implement features of an embodiment of the invention. It should be noted that the organization and number of systems used in this particular embodiment is an example only, and the image processing system that is used to implement an embodiment of the invention can be any of various configurations using either one or many computer system platforms.

Still referring to FIG. 3, image receiving system 302 includes computer readable storage media 304 and, for purposes of the invention, receives data in the form of incoming administrative returns, 306. Image receiving system 302 also accesses configuration files and profiles, 308, as is known in the art. The image receiving system receives the administrative admin returns, 306, in the form of cash letter files identifying returned items. The image receiving system is connected to internal network 310. Also connected to internal network 310 is check image management system (CIMS) 312, which includes a computer readable storage media, 314. CIMS 312 can also access and store images on an administrative returns archive, 316. In practice, this archive may be included within or embodied on computer readable storage medium 314. Data is sent to CIMS 312 in the form of a load file, 318, in which images are CIFF formatted as is known in the art.

In the example embodiment of FIG. 3, system 320 can include accounting records which are referenced in a master index, 322, as well as the CPCS for the enterprise. Data is sent to system 320 over internal network 310, in the form of detail from the x9.37 file previously discussed, and endorsement records, both shown as data 324. Finally, administrative returns processing system 326 includes computer readable storage media 328, on which computer readable program code 330 is stored. System 326 in conjunction with the computer readable program code parses identifiers from administrative return cash letter files and assembles and sends the reports according to example embodiments of the invention. Administrative returns data, 332 is fed to system 326. The reports are produced in the format that may be referred to as a "pick list," 334, which is sent via appropriate networking resources to the various item processing sites. General ledger settlement records 336 are also forwarded by system 326 and are used by system 320 to update stored ledger information based on the previously discussed cash letter settlement table. Although for purposes of illustration FIG. 3 shows computer program code 330 working in conjunction with a single system to provide the reporting function, in fact, it is possible to devise an embodiment where this computer program code is distributed across various machines. It should also be noted that this computer program code can be supplied for installation on system 326 on a portable media such as a diskette or compact disc.

Figure 4:
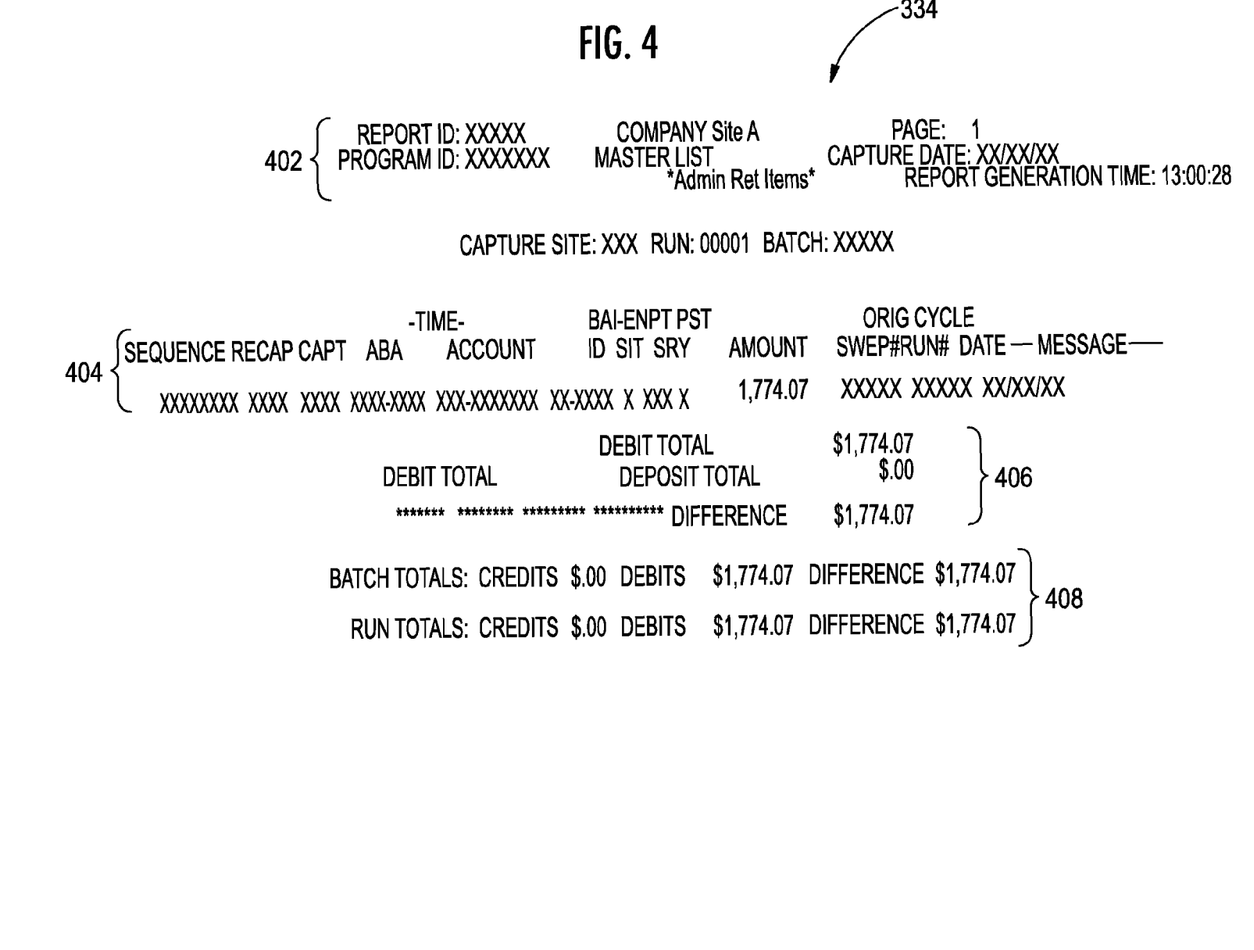
FIG. 4 is an illustrative example of a report format that might be generated in the course of executing a method according to an embodiment of the invention.

FIG. 4 presents an illustrative example of a pick list IP site report, 334, as previously discussed. Section 402 of report 334 includes administrative information, for example, the IP site to which the report is directed. In this case, the report is directed to site A. Other information such as date, time, site number, batch and run information is also included in report header 402. Detail section 404 of report 334 lists the actual items. In this example, only one item is listed in this report. The various columns of the report are identified by headers, which have titles that would be familiar to those with skill in the check image processing arts. These include, for example, the sequence number, account number, amount, etc. A summary of accounting information is shown at the bottom of the detail portion of the report. This summary information, 406, includes the debit total, deposit total, and the difference between the two when taking into account all of the items above. Finally, batch and run totals 408 provide information on the entire accounting for the reports run at the current reporting time.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, action, or portion of code, which comprises one or more executable instructions or actions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems or operators which perform the specified functions or acts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A computer-implemented method of processing, by a bank, an administrative cash letter file identifying at least one returned defective image item from among a plurality of items, wherein the bank comprises a plurality of processing sites for handling the plurality of items, the method comprising:

obtaining from the administrative cash letter file an identifier for a processing site of the bank for each returned defective image item identified in the administrative cash letter file, wherein the defective image items are being returned to the bank for reprocessing due to defective images that cannot be processed by an institution;

identifying, through the use of a processor, a processing site of the bank using the identifier indicating the processing site from a plurality of processing sites at which the each of the returned defective image items were processed;

assembling a separate report corresponding to each processing site as indicated by the identifier, the separate report listing each returned defective image item for the processing site; and forwarding using an internal network the separate report to each processing site to enable the processing site to re-process each returned defective image item specific to the processing site using an original paper item that is stored at the processing site corresponding to each returned defective image item.

2. The computer-implemented method of claim 1 further comprising updating stored ledger information based on a stored, cash letter settlement table.

3. The computer-implemented method of claim 2 further comprising sending at least a portion of the stored ledger information to a general ledger system to update cash letter information.

4. The computer-implemented method of claim 3 further comprising updating stored ledger information related to work-in-process for each processing site.

5. The computer-implemented method of claim 4 wherein the obtaining of the identifier further comprises examining an item sequence number contained in the administrative cash letter file.

6. The computer-implemented method of claim 3 wherein the obtaining of the identifier further comprises examining an item sequence number contained in the administrative cash letter file.

7. The computer-implemented method of claim 1 wherein the obtaining of the identifier further comprises examining an item sequence number contained in the administrative cash letter file.

8. Apparatus for processing in a bank, an administrative cash letter file identifying returned defective image items from among a plurality of items, the apparatus comprising:
means for obtaining from the administrative cash letter file an identifier for a processing site from among a plurality of processing sites of the bank, the identifier being obtained for each of the returned defective image items identified in the administrative cash letter file, wherein the defective image items are being returned to the bank for reprocessing due to defective images that cannot be processed by an institution;
means for identifying a processing site of the bank using the identifier indicating the processing site from a plurality of processing sites at which the each of the returned defective image items were processed;
means for assembling separate reports, one report corresponding to one processing site from among the plurality of processing sites as indicated by the identifier, the one report listing the returned defective image items specific to the one processing site; and
means for forwarding over an internal network the separate reports to the plurality of processing sites to enable each processing site to re-process the returned defective image items specific to the one processing site using original paper items that are stored at the processing site corresponding to the returned defective image items.

9. The apparatus of claim 8 further comprising means for updating stored ledger information based on a stored, cash letter settlement table.

10. The apparatus of claim 9 further comprising means for sending at least a portion of the stored ledger information to a general ledger system to update cash letter information.

11. The apparatus of claim 10 further comprising means for updating stored ledger information related to work-in-process for each processing site.

12. The apparatus of claim 9 further comprising means for updating stored ledger information related to work-in-process for each processing site.

13. An image processing system for a bank comprising:
an image receiving system to receive administrative cash letter files identifying returned defective image items from among a plurality of items wherein the defective image items are being returned to the bank for reprocessing due to defective images that cannot be processed by an institution;
an internal network connected to the image receiving system; and
an administrative returns processing system connected to the internal network to obtain from each administrative cash letter file an identifier for a processing site from among a plurality of processing sites of the bank, the identifier being obtained for each of the returned defective image items and indicating at which of the processing sites the returned defective image items were processed, and to assemble and send separate reports over the internal network, one report corresponding to one processing site from among the plurality of processing sites,
wherein the one report lists the returned defective image items specific to the one processing site to enable the reprocessing of the returned defective image items using original paper items that are stored at the processing site corresponding to the returned defective image items.

14. The image processing system of claim 13 further comprising a master index of stored general ledger information connected to the network to enable updating stored ledger information based on a stored, cash letter settlement table.

15. The image processing system of claim 14 further comprising a check image management system connected to the network to archive administrative returns.

16. The image processing system of claim 13 further comprising a check image management system connected to the network to archive administrative returns.

17. The image processing system of claim 13, wherein the plurality of items comprises a plurality of check images sent from the bank to a second bank, wherein the returned defective image items comprise check images returned to the bank from the second bank due to an error, wherein the plurality of processing sites of the bank comprises a plurality of check capturing sites for capturing check information from the original paper items comprising paper checks, and wherein the identifier obtained for a returned defective image item identifies the processing site where a paper check corresponding to the returned defective image item was captured.

18. An apparatus comprising:
an administrative cash letter file receiving system configured to receive, for a first bank, an administrative cash letter file from a second bank, wherein the administrative cash letter file indicates a plurality of items that were formerly sent from the first bank to the second bank but are being returned by the second bank for reprocessing due to a plurality of defective images associated with the plurality of items that cannot be processed by the second bank, the plurality of items comprising a first item and a second item, wherein the administrative cash letter file further comprises an indicator associated with each of the plurality of items identifying a processing site of the first bank from a plurality of processing sites at which the each of the returned defective images were processed, including a first indicator associated with the first item and a second indicator associated with the second item;

an administrative cash letter file processing system communicably coupled to the administrative cash letter file receiving system and configured to generate a plurality of reports based on the administrative cash letter file and on the indicator associated with each of the plurality of items indicated by the administrative cash letter file, the plurality of reports including a first report comprising information identifying the first item and a second report comprising information identifying the second item; and a report communication system communicably coupled to the administrative cash letter file processing system and a the plurality of processing sites of the first bank and configured to communicate the plurality of reports to one of the plurality of processing sites of the first bank based on the indicator associated with each of one or more items identified by the report, including communicating the first report to a first processing site based on the first indicator and the second report to a second processing site based on the second indicator;

wherein the first item and the second item are a first returned defective image item and a second returned defected image item; and wherein the first processing site reprocesses the first item using a corresponding original first paper item that is stored at the first processing site and the second processing site reprocesses the second item using a corresponding original second paper item that is stored at the second processing site.

19. The apparatus of claim 18, further comprising:
the plurality of processing sites, wherein the plurality of processing sites are configured to receive reports from the report communication system, locate items identified in each report, and reprocess the items identified in each report, and wherein the plurality of processing sites comprise:
a first processing site configured to receive the first report and configured to locate and reprocess the first item based on information in the first report, and
a second processing site configured to receive the second report and configured to locate and reprocess the second item based on information in the second report.

20. The apparatus of claim 18, wherein the first bank comprises a depository bank and the second bank comprises a clearing bank.

21. A computer program product for processing, by a bank, an administrative cash letter file identifying at least one returned defective image item from among a plurality of items, wherein the bank comprises a plurality of processing sites for handling the plurality of items, the computer program product comprising at least one non-transitory computer-readable medium having computer-readable program code portions embodied therein, the computer-readable program code portions comprising:
an executable portion configured for obtaining from the administrative cash letter file an identifier for a processing site of the bank for each returned defective image item identified in the administrative cash letter file, wherein the defective image items are being returned to the bank for reprocessing due to defective images that cannot be processed by an institution;
an executable portion configured for identifying a processing site of the bank using the identifier indicating the processing site from a plurality of processing sites at which the each of the returned defective image items were processed;
an executable portion configured for assembling a separate report corresponding to each processing site as indicated by the identifier, the separate report listing each returned defective image item for the processing site; and
an executable portion configured for forwarding using an internal network the separate report to each processing site to enable the processing site to re-process each returned defective image item specific to the processing site using an original paper item that is stored at the processing site corresponding to each returned defective image item.

22. The computer program product of claim 21, further comprising an executable portion configured for updating stored ledger information based on a stored, cash letter settlement table.

23. The computer program product of claim 22, further comprising an executable portion configured for sending at least a portion of the stored ledger information to a general ledger system to update cash letter information.

24. The computer program product of claim 23, further comprising an executable portion configured for updating stored ledger information related to work-in-process for each processing site.

25. The computer program product of claim 24, wherein the executable portion configured for obtaining of the identifier further comprises examining an item sequence number contained in the administrative cash letter file.

26. The computer program product of claim 23, wherein the executable portion configured for obtaining the identifier further comprises examining an item sequence number contained in the administrative cash letter file.

27. The computer program product of claim 21, wherein the executable portion configured for obtaining the identifier further comprises examining an item sequence number contained in the administrative cash letter file.

* * * * *